(12) United States Patent
Yoon et al.

(10) Patent No.: US 12,212,180 B2
(45) Date of Patent: Jan. 28, 2025

(54) METHOD AND SYSTEM FOR CHARGING BATTERY USING FUEL CELL

(71) Applicant: Kencoa Aviation, Incheon (KR)

(72) Inventors: Dong Han Yoon, Seongnam-si (KR); Hyeong Seog Kim, Suwon-si (KR)

(73) Assignee: Kencoa Aviation, Incheon (KR)

( * ) Notice: Subject to any disclaimer, the term of this patent is extended or adjusted under 35 U.S.C. 154(b) by 0 days.

(21) Appl. No.: 18/663,044

(22) Filed: May 13, 2024

(65) Prior Publication Data

US 2024/0405593 A1 Dec. 5, 2024

(30) Foreign Application Priority Data

Jun. 1, 2023 (KR) .................. 10-2023-0070953

(51) Int. Cl.
*H02J 7/34* (2006.01)
*H02J 7/00* (2006.01)

(52) U.S. Cl.
CPC .............. *H02J 7/34* (2013.01); *H02J 7/0047* (2013.01); *H02J 7/00714* (2020.01); *H02J 7/007194* (2020.01)

(58) Field of Classification Search
CPC ........................................................ H02J 7/34
USPC .......................................................... 320/101
See application file for complete search history.

(56) References Cited

U.S. PATENT DOCUMENTS

| | | | | |
|---|---|---|---|---|
| 2002/0182454 | A1* | 12/2002 | Autenrieth | H01M 8/04955 320/101 |
| 2003/0207156 | A1* | 11/2003 | Ovshinsky | H01M 10/66 180/65.245 |
| 2009/0167239 | A1* | 7/2009 | Yano | H02J 7/007182 320/101 |
| 2021/0328239 | A1* | 10/2021 | Namba | H01M 8/04753 |

FOREIGN PATENT DOCUMENTS

| | | |
|---|---|---|
| JP | 2019-083675 A | 5/2019 |
| JP | 2019-160402 A | 9/2019 |
| KR | 10-2010-0081834 A | 7/2010 |
| KR | 10-1351349 B1 | 1/2014 |
| KR | 10-2018-0114973 A | 10/2018 |
| KR | 10-2022-0068673 A | 5/2022 |

\* cited by examiner

*Primary Examiner* — Yalkew Fantu
(74) *Attorney, Agent, or Firm* — INVENSTONE PATENT, LLC

(57) ABSTRACT

Provided are a method and system for charging a battery using a fuel cell. The method includes: running the fuel cell; setting a voltage input from the fuel cell as a preset first input adapting voltage ($1^{st}$ IAV), when the input power from the fuel cell is lower than the output power to the battery; detecting whether an output current to the battery reaches a first low detect current ($1^{st}$ LDC) while the battery is being charged based on the first input adapting voltage; and resetting the first input adapting voltage based on a detection result.

16 Claims, 9 Drawing Sheets

600

METHOD AND SYSTEM FOR CHARGING BATTERY USING FUEL CELL

CROSS REFERENCE TO RELATED APPLICATION

This application claims priority from Republic of Korea Patent Application No. 10-2023-0070953, filed on Jun. 1, 2023, which is hereby incorporated by reference in its entirety.

BACKGROUND

Field

The present disclosure relates to a method and system for charging a battery using a fuel cell and, more particularly, to a method and system for performing charging while keeping the input power from a fuel cell constant.

Related Art

A fuel cell is an environmentally-friendly energy-generating device that can directly convert the chemical energy of hydrogen and oxygen into electrical energy, and has a high potential of being used as a new energy means that can replace conventional generators. Thus, fuel cells are attracting much attention, but there still remain a number of issues to be overcome to make them commercially available.

In particular, the voltage of a fuel cell may dynamically vary due to load variations during energy generation. A decrease in voltage can cause the fuel cell to experience thermal runaway, and an increase in voltage can cause the fuel cell to undergo catalytic oxidation or cause combustion of carbon in the fuel cell, which may result in aging and functional loss problems. This creates a demand for a method for controlling the operation of a fuel cell with optimal voltage.

Patent Document

Korean Laid-Open Patent No. 10-0835091

SUMMARY

The present disclosure has been made in an effort to solve the foregoing problems and to provide a method and system for charging a battery by controlling the operation of a fuel cell with optimal operating voltage while keeping the input power from a fuel cell constant.

An embodiment of the present disclosure provides a method for charging a battery using a fuel cell, the method including: running the fuel cell: setting a voltage input from the fuel cell as a preset first input adapting voltage ($1^{st}$ IAV), when the input power from the fuel cell is lower than the output power to the battery: detecting whether an output current to the battery reaches a first low detect current ($1^{st}$ LDC) while the battery is being charged based on the first input adapting voltage; and resetting the first input adapting voltage based on a detection result.

In an aspect, the method may further include setting an increasing voltage detect point (IVDP) for the voltage input from the fuel cell.

In another aspect, the setting of an increasing voltage detect point further include stopping charging the battery upon detecting a certain number of times or more that the voltage input from the fuel cell exceeds the increasing voltage detect point.

In yet another aspect, the method may further include, before running the fuel cell, setting at least one of the charger's constant voltage (CV), constant current (CC), termination current (TC), delta current (DC), input adapting voltage, and increasing voltage detection point based on information on an optimal operation and optimal temperature for the fuel cell.

In a further aspect, the resetting may include: resetting the first input adapting voltage as a second input adapting voltage ($2^{nd}$ IAV) if the output current reaches the first low detect current; and maintaining the first input adapting voltage unless the output current reaches the first low detect current.

In a further aspect, the method may further include detecting whether the output current to the battery reaches a second low detect current ($2^{nd}$ LDC) while the battery is being charged based on the second input adapting voltage.

In a further aspect, the second input adapting voltage may be set to a voltage that is lower or higher than the first input adapting voltage.

In a further aspect, the resetting may include repeatedly resetting the first input adapting voltage before the battery reaches a constant voltage or the state of charge of the battery reaches a preset fully capacity.

Another embodiment of the present disclosure provides a method for charging a battery using a fuel cell, the method including: running the fuel cell: setting a current input from the fuel cell as a preset first input adapting current ($1^{st}$ IAC), when the input power from the fuel cell is lower than the output power to the battery: detecting whether an output current to the battery reaches a first low detect current ($1^{st}$ LDC) while the battery is being charged based on the first input adapting current; and resetting the first input adapting current based on a detection result.

In an aspect, the method may further include setting an increasing voltage detect point (IVDP) for the voltage input from the fuel cell.

In another aspect, the setting of an increasing voltage detect point further include stopping charging the battery upon detecting a certain number of times or more that the voltage input from the fuel cell exceeds the increasing voltage detect point.

In yet another aspect, the method may further include, before running the fuel cell, setting at least one of the charger's constant voltage (CV), constant current (CC), termination current (TC), delta current (DC), input adapting current, and increasing voltage detection point based on information on an optimal operation and optimal temperature for the fuel cell.

In a further aspect, the resetting may include: resetting the first input adapting voltage as a second input adapting current ($2^{nd}$ IAC) if the output current reaches the first low detect current; and maintaining the first input adapting current unless the output current reaches the first low detect current. In a further aspect, the method may further include detecting whether the output current to the battery reaches a second low detect current ($2^{nd}$ LDC) while the battery is being charged based on the second input adapting current.

In a further aspect, the second input adapting current may be set to a current that is higher or lower than the first input adapting current.

In a further aspect, the resetting may include repeatedly resetting the first input adapting current before the battery reaches a constant voltage or the state of charge of the battery reaches a preset fully capacity:

Yet another exemplary embodiment of the present disclosure provides a system for charging a battery using a fuel cell, the system including: a fuel cell: a battery; a fuel cell part for running the fuel cell: a constant voltage mode circuit which sets a limit when an output voltage of a charger is higher than a reference voltage; a constant current mode circuit which sets a limit when an output current of the charger is higher than a reference current: a charging circuit that sets a voltage input from the fuel cell as a preset first input adapting voltage ($1^{st}$ IAV), when the input power from the fuel cell is lower than the output power to the battery based on operations of the constant voltage mode circuit and the constant current mode circuit, detects whether an output current to the battery reaches a first low detect current ($1^{st}$ LDC), and resets the first input adapting voltage based on a detection result; and a battery part for charging the battery based on the first input adapting voltage.

Yet another exemplary embodiment of the present disclosure provides a system for charging a battery using a fuel cell, the system including: a fuel cell: a battery: a fuel cell part for running the fuel cell: a constant voltage mode circuit which sets a limit when an output voltage of a charger is higher than a reference voltage: a constant current mode circuit which sets a limit when an output current of the charger is higher than a reference current: a charging circuit that sets a current input from the fuel cell as a preset first input adapting current ($1^{st}$ IAC), when the input power from the fuel cell is lower than the output power to the battery based on operations of the constant voltage mode circuit and the constant current mode circuit, detects whether an output current to the battery reaches a first low detect current ($1^{st}$ LDC), and resets the first input adapting current based on a detection result; and a battery part for charging the battery based on the first input adapting current.

Embodiments of the present disclosure may have effects including the following advantages. However, since it does not mean that the embodiments of the present disclosure should include all of the effects, the scope of the present disclosure should not be construed as being limited thereby.

According to an embodiment of the present disclosure, a method and system for charging a battery using a fuel cell can prevent degradation and aging of the fuel cell by controlling the fuel cell to operate in an optimal condition.

Moreover, the battery can be charged regardless of load operation or power consumption.

In addition, the state of charge (SoC) of the battery can be adaptively regulated.

DESCRIPTION OF EXEMPLARY EMBODIMENTS

Figure 1:
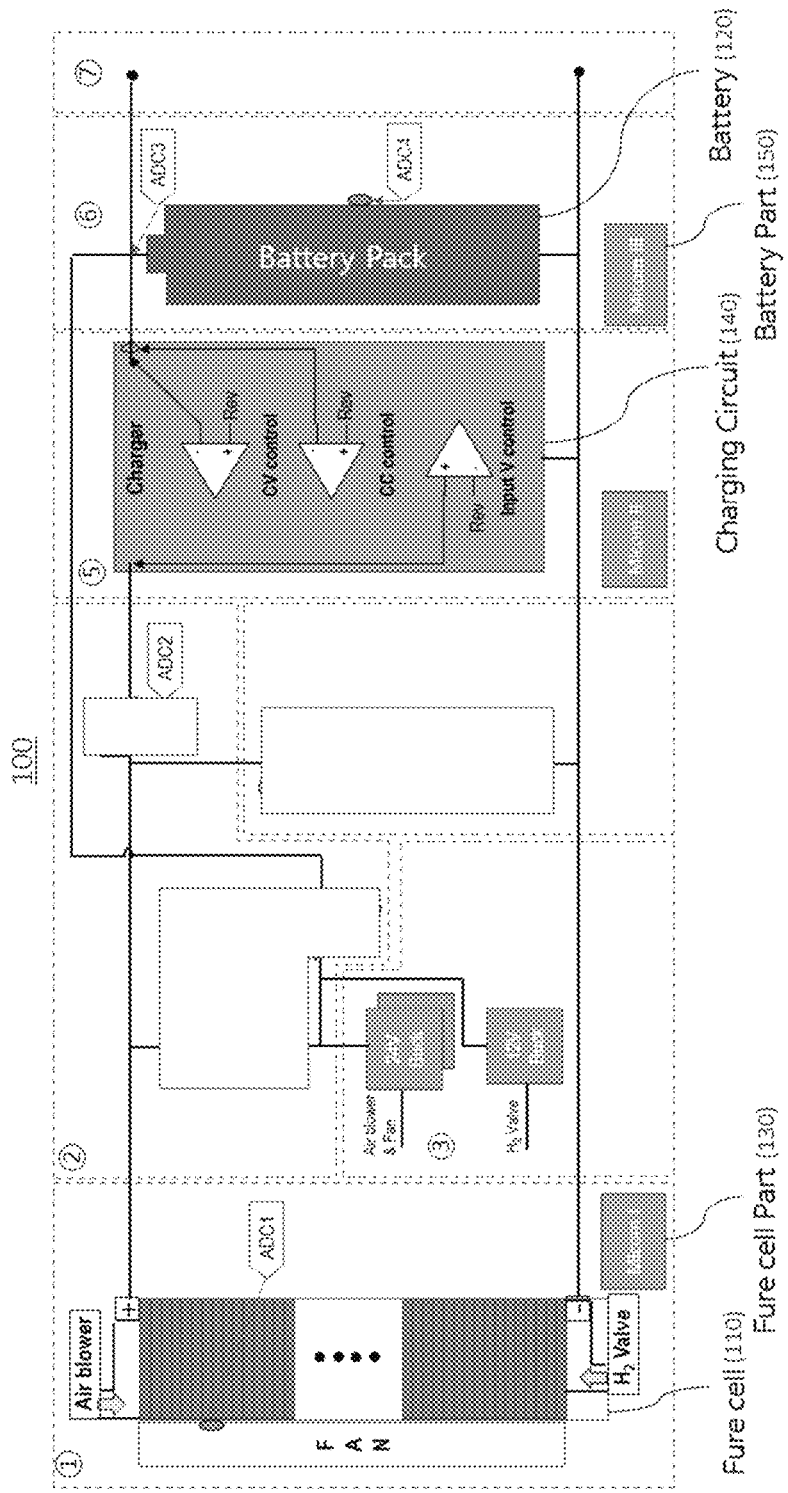
FIG. 1 is a view schematically showing a structure of a system for charging a battery using a fuel cell according to an embodiment of the present disclosure.

The present disclosure may be subjected to many changes and have several forms, and specific embodiments thereof are illustrated in the drawings and described in detail in the specification. However, it will be understood that the present invention is not intended to be limited to the specific forms set forth herein, and all changes, equivalents, and substitutions included in the technical scope and spirit of the present disclosure are included.

It will be understood that, although the terms first, second, A, B, etc. may be used herein to describe various elements, the elements should not be limited by the terms. The terms are only used to distinguish one element from another. For example, a first element could be termed a second element, and similarly, a second element could be termed a first element without departing from the scope of the present disclosure. As used herein, the term "and/or" includes any one or combination of a plurality of the associated listed items.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terms used in the description are intended to describe embodiments only, and shall by no means be restrictive. Unless clearly used otherwise, expressions in a singular form include a meaning of a plural form. In the present specification, it should be understood that the terms such as "comprises" or "have" are intended to specify the existence of a feature, number, step, operation, element, component, or a combination thereof described in the specification, but do not preclude the existence or addition possibility of one or more other features, numbers, steps, operations, elements, components, or combinations thereof.

Unless otherwise defined herein, all terms used in the present invention including technical or scientific terms have the same meanings as terms that are generally understood by those skilled in the art related to the field of the present invention. The same terms as those that are defined in a general dictionary should be understood to have the same meanings as contextual meanings of the related art. Unless the terms are explicitly defined in the present invention, the terms should not be interpreted with ideal or excessively formal meanings.

Prior to a detailed description of the drawings, it should be clarified that division of components in the present specification is performed merely based on main functions performed by the respective components. That is, two or more components which will be described later may be integrated into a single component or, alternatively, a single component may be provided to be divided into two or more components depending on subdivided functions.

Further, it is apparent that each of the components, which will be described later, may additionally perform some or all of functions performed by other components, in addition to main functions performed thereby, and some of the main functions performed by the respective components may be shared with other components and may be performed thereby. Therefore, the presence or absence of individual components, which are described in the present specification, should be functionally interpreted.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a view schematically showing a structure of a system for charging a battery using a fuel cell according to an embodiment of the present disclosure.

Referring to FIG. 1, the system for charging a battery using a fuel cell according to an embodiment of the present disclosure is a device that charges a battery based on electric power produced by running a fuel cell, which may produce electric power by running the fuel cell, if the battery has insufficient remaining power or needs more power due to load operation. The battery charging system 100 using a fuel cell may include a fuel cell 110, a battery 120, a fuel cell part 130, a charging circuit 140, and a battery part 150. The charging circuit 140 may include a constant voltage mode circuit, a constant current mode circuit, an input voltage detection amplifier circuit for a constant voltage mode of input voltage, and an input current detection amplifier circuit for a constant current mode of input voltage. Based on the battery charging system 100 using a fuel cell, shown in FIG. 1, a program (or application) including an executable algorithm that can be executed on a computer may be implemented. The program may be stored and provided in a transitory or non-transitory computer readable medium.

The fuel cell 110 is a device that is provided in the charging system 100 to produce electric power. The fuel cell 100 may produce electric power through electrochemical reactions between a fuel and an oxidizing agent. Although the fuel cell 110 is described as being a hydrogen fuel cell, for example, which produces electrical energy by using hydrogen as a fuel that reacts with oxygen in air, other types of fuel cells also may be utilized.

The battery 120 is a device that is provided in the charging system 110 to store electrical power produced by a fuel cell and provide the stored electrical power to run loads. Although the battery 120 is described as being a secondary battery or a storage battery, for example, which can be charged and discharged multiple times, other types of batteries also may be utilized.

The fuel cell part 130 is a device that runs the fuel cell 110 provided in the charging system 100. The fuel cell part 130 may turn on or off the fuel cell 110 to activate or stop an electrochemical reaction in the fuel cell 110. When the fuel cell 110 is turned on, the fuel cell part 130 may run an air blower provided in the charging system 100 to blow compressed air to the fuel cell 110, thereby assisting in the power-generating operation of the fuel cell 110. The fuel cell part 130 may be implemented by a microcomputer, a processor, a CPU, an AP, etc. provided in the charging system 100. In the following description, although the fuel cell part 130 is described as being a microcomputer, for example, other types of devices mentioned above also may be utilized.

The charging circuit 140 is a device that delivers to the battery 120 electrical power produced by running the fuel cell 110. The charging circuit 140 may be provided in a charger of the charging system 100, and may perform a battery charging operation when the input power from the fuel cell 110 to the charger is lower than the output power from the charger to the battery 120. The charging circuit 140 may set a voltage input from the fuel cell 110 as an input adapting voltage to fix the input voltage of the fuel cell 110. That is, the charging circuit 130 may charge the battery 120 while the voltage input from the fuel cell 110 is fixed.

Since charging is performed while the voltage is fixed, the output current from the charging circuit 140 may decrease gradually. The charging circuit 140 may detect a gradual decrease in the output current, and when the output current reaches a low detect current after a certain period of time, may reset the input adapting voltage in order to keep the current from decreasing any further. That is, the output of the fuel cell may be adjusted upward or downward, or the input adapting voltage may be reset to a voltage that is lower or higher than the previous input adapting voltage to adapt to a change in battery charging condition. The charging circuit 140 may perform battery charging by repeating this process. The charging circuit 140 may stop charging when the battery 120 reaches a fully charged state (the battery voltage is a constant voltage) or the battery's state of charge reaches a preset full capacity, and if necessary, may keep charging the battery even after the battery becomes fully charged. The charging circuit 140 may be implemented by a circuit, an electrical element, etc. provided in the charger of the charging system 100, and may be run by control from the microcomputer, processor, CPU, AP, etc. of the charging system 100.

The battery part 140 is a device that charges the battery 120 using electrical power delivered from the charging circuit 140. The battery part 150 may measure the remaining power of the battery 120. If the battery 120 has insufficient remaining power, the battery part 140 may send a measurement of the remaining power to the fuel cell part 130 to run the fuel cell 110. The battery part 150 may be implemented as the microcomputer, processor, CPU, AP, etc. provided in the charging system 100. Although the battery part 150 is described as being a microcomputer, for example, other types of devices mentioned above also may be utilized.

Meanwhile, as illustrated in FIG. 1, although the fuel cell part 130, the charging circuit 140, and the battery part 150, as used herein, are described as being implemented as Micom 1, a circuit controlled by Micom 2, and Micom 3, respectively, they may be integrated into a single microcomputer if necessary.

Figure 2:
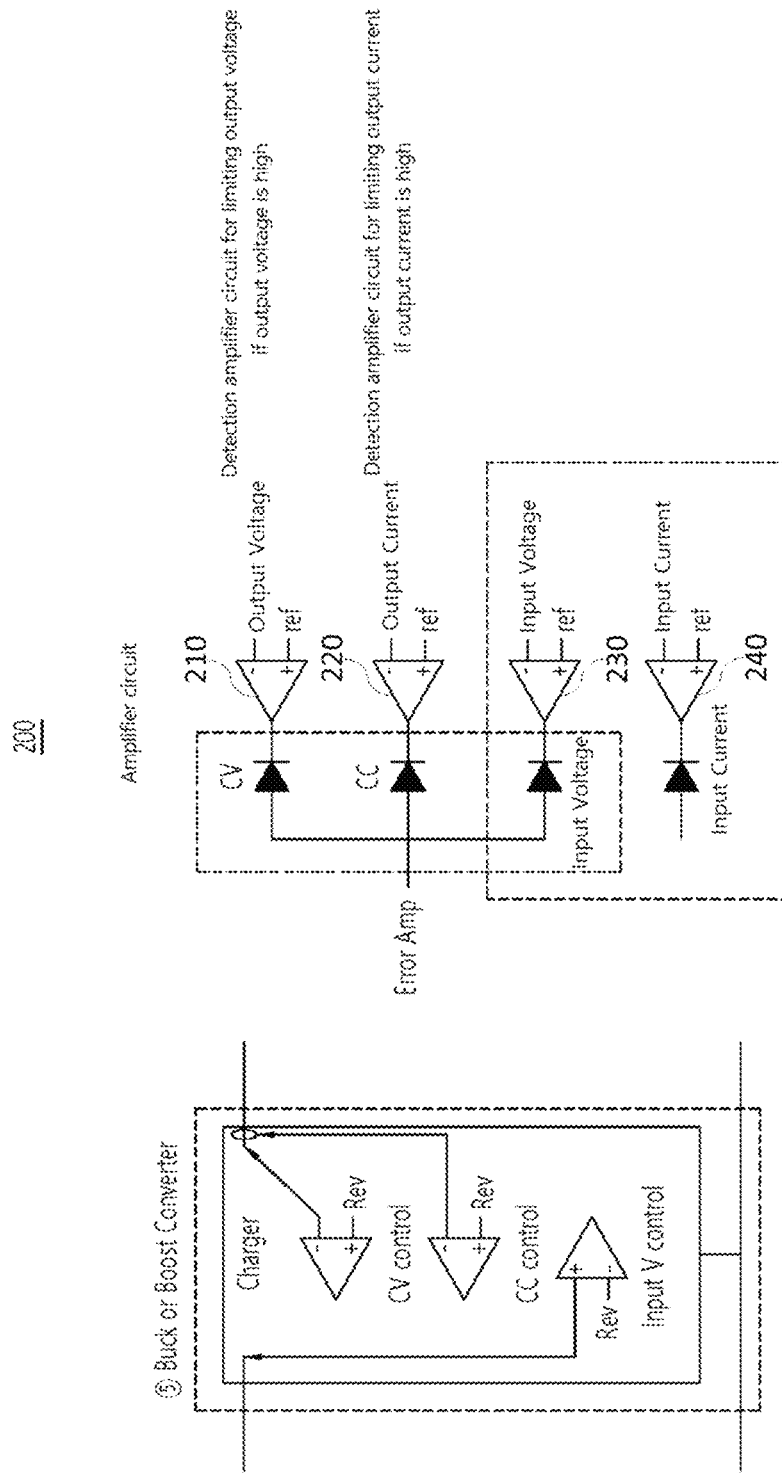
FIG. 2 is a view showing a charging circuit of a charger.

FIG. 2 is a view showing a charging circuit of a charger.

Referring to FIG. 2, the charging circuit may be implemented as the charging circuit 140 of the battery charging system 100 using a fuel cell, described with reference to FIG. 1. The charging circuit 140 may include a constant voltage mode circuit 210, a constant current mode circuit 220, an input voltage detection amplifier circuit 230 for a constant voltage mode of input voltage, and an input current detection amplifier circuit 240 for a constant current mode of input current. Each of the circuits may be controlled by Micom 2 in FIG. 1. By setting a limit when the input voltage is low or the input current is high, the charging circuit 140 may control the fuel cell to output an electric current while keeping the input voltage constant.

The constant voltage mode circuit 210 is a detection amplifier circuit that sets a limit on an output voltage from the charger to the battery if the output voltage is high. For example, the constant voltage mode circuit 210 may set a limit on output if the output voltage of the charger is higher than a reference voltage by comparing the output voltage with the reference voltage. That is, an operation of maintaining the output voltage within a constant voltage range may be performed.

The constant current mode circuit 220 is a detection amplifier circuit that sets a limit on an output current from the charger to the battery if the output current is high. For example, the constant current mode circuit 220 may set a limit on output if the output current of the charger is higher than a reference current by comparing the output current with the reference current. That is, an operation of maintaining the output current within a constant current range may be performed.

In this way, the output power from the charger may be kept higher than input power, by setting a limit on the voltage and current output from the charger by the constant voltage mode circuit 210 and the constant current mode circuit 220, respectively. That is, the input power from the fuel cell to the charger may become lower than the output power from the charger to the battery.

In this instance, the charging circuit 140 may set a voltage input from the fuel cell as an input adapting voltage (IAV) or set a current input from the fuel cell as an input adapting current (IAC). In other words, it may perform an operation of fixing the voltage or current input from the fuel cell to a certain value while the battery is being charged. Micom 2 may perform the above-described operation by running either the input voltage detection amplifier circuit 230 or the input current detection amplification circuit 240.

For example, the input voltage detection amplifier circuit 230 may be run to control the input voltage so as to limit the input power if the voltage input to the charger is lower than a reference voltage (ref). Here, the reference voltage of the input voltage detection amplifier circuit 230 may be the input adapting voltage (IAV). That is, the input voltage detection amplifier circuit 230 may perform an operation of keeping the input voltage the same as the input adapting voltage (IAV) by comparing the input voltage and the input adapting voltage (IAV). In other words, the input voltage detection amplifier circuit 230 may convert the input voltage into a constant voltage by controlling the input voltage from the fuel cell to keep it constant at the input adapting voltage.

As another example, the input current detection amplifier circuit 240 may be run to control the input current if the current input to the charger is higher than a reference current (ref). Here, the reference current of the input current detection amplifier circuit 240 may be the input adapting current (IAC). That is, the input current detection amplifier circuit 240 may perform an operation of keeping the input voltage the same as the input adapting current (IAC) by comparing the input current and the input adapting current (IAC). Incidentally, when setting a current value, the current value may be set while monitoring whether the input voltage is within a constant voltage range. Accordingly, the input adapting voltage and the input adapting current may be used in substantially the same manner to charge the battery. In other words, the input current detection amplifier circuit 240 may convert the input current into a constant current by controlling the input current from the fuel cell to keep it constant at the input adapting current.

Micom 2 may control the input voltage detection amplifier circuit 230 or the input current detection amplifier circuit 240 to repetitively operate until battery charging is completed. For example, with each cycle, the input voltage detection amplifier circuit 230 may be used to control the input voltage, or the input current detection amplifier circuit 240 may be used to control the input current. In accordance with this operation, the input voltage or input current from the fuel cell may be kept constant within an optimal operating range for the fuel cell.

Figure 3:
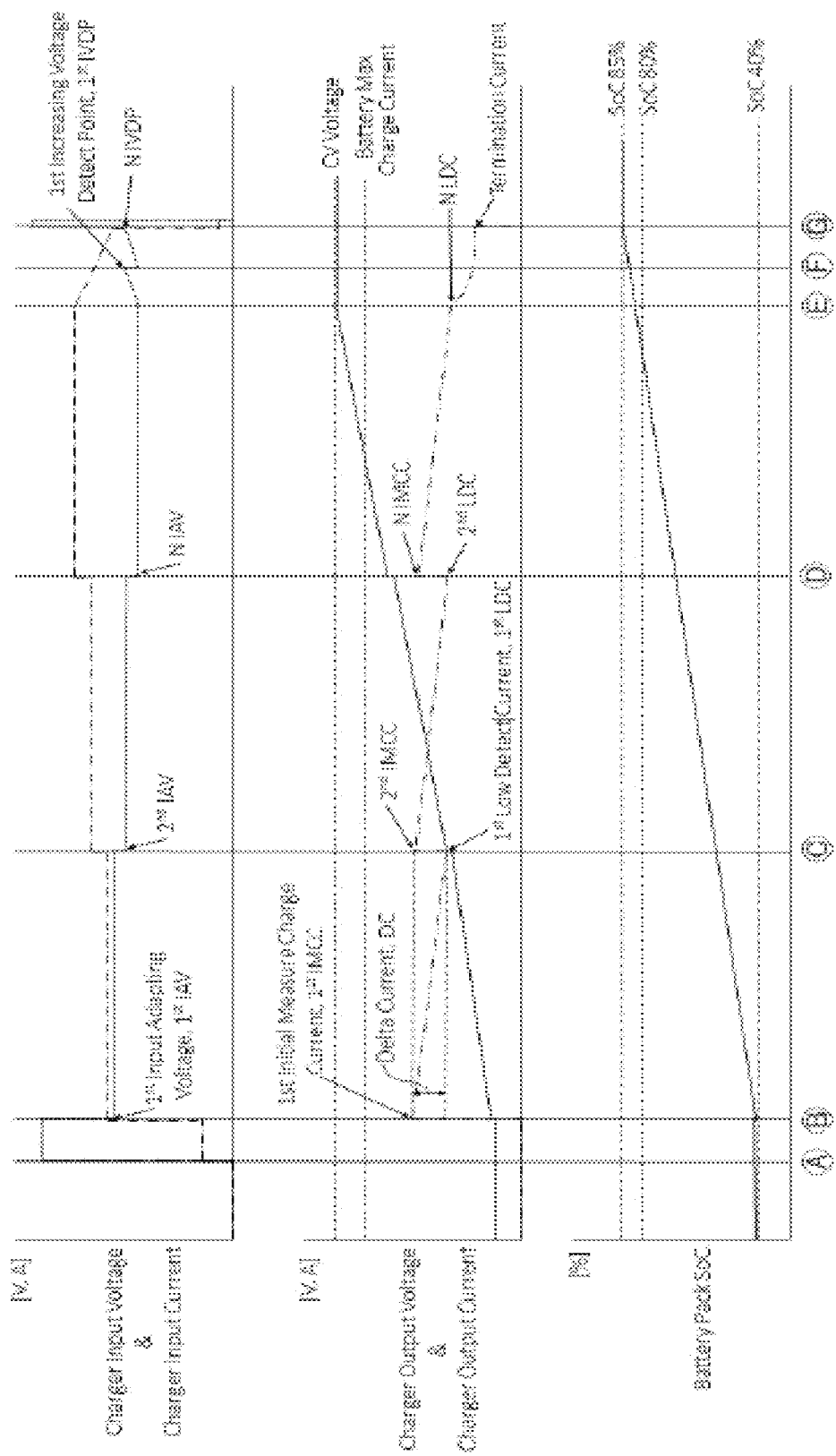
FIG. 3 is a view showing a process of performing charging by setting an input adapting voltage.

FIG. 3 is a view showing a process of performing charging by setting an input adapting voltage.

An upper portion of FIG. 3 shows a graph of charger input voltage and charger input current, a middle portion of FIG. 3 shows a graph of charger output voltage and charger output current, and a lower portion of FIG. 3 shows a graph of the state of charge (SoC) of a battery pack. The charger input voltage is indicated by a dotted line, the charger input current is indicated by a dash-dotted line, the charger output voltage is indicated by a solid line, and the charger output current is indicated by a dash-dot-dot line.

Referring to FIG. 3, the input adapting voltage (IAV) may be set by the input voltage detection amplifier circuit 230 which has been described with reference to FIG. 2. The input voltage detection amplifier circuit 230 may operate in the order from Time A to Time G. For example, Time A may be a point in time at which the fuel cell starts running, Time B may be a point in time at which electric power is transmitted from the fuel cell to the charger, Time C and Time D may be a point in time at which the input adapting voltage is reset, Time E and Time F may be a point in time at which the input voltage of the charger reaches an increasing voltage detect point (IVDP), and Time G may be a point in time at which the charging process is terminated. Hereinafter, the operation of the charging system 100 will be described in the order from Time A to Time G.

Once the fuel cell starts running at Time A, electric power is transmitted to the charger at Time B after a while. The charger input voltage transmitted from the fuel cell to the charger at Time A may be a voltage that has yet to be controlled by the input voltage detection amplifier circuit 230, which may be higher than the target voltage (IAV).

At Time B, the input voltage detection amplifier circuit 230 sets a first input adapting voltage (1st IAV). The first input adapting voltage may be set before the battery is charged. Before performing charging, the charging system 100 may receive at least one of the charger's constant voltage (CV), constant current (CC), termination current (TC), delta current (DC), input adapting voltage, and increasing voltage detection point based on information on an optimal operation and optimal temperature for the fuel cell to configure settings for the circuit. For the information on the optimal operation and optimal temperature for the fuel cell, specification information provided by the manufacturer of the fuel cell may be used. For example, the above settings may be automatically configured by receiving the specification information from the administrator, or the administrator may directly enter the settings by referring to the specification information.

Meanwhile, the voltage input (charger input voltage) from the fuel cell may be fixed at the same voltage as the first input adapting voltage, by setting the first input adapting voltage. Since the voltage is fixed, the current output (charger output current) from the charger may decrease gradually. In this instance, the input voltage detection amplifier circuit 230 may detect whether the decreasing current reaches a first low detect current ($1^{st}$ LDC). For example, the input voltage detection amplifier circuit 230 may detect whether the current output from the charger reaches the first low detect current by comparing whether the difference between a first initial measure charge current ($1^{st}$ IMCC), measured at an initial stage of charging, and the current current corresponds to a preset delta current (DC). That is, the first initial measure charge current minus the first low detect current may be compared with the preset delta current to find out whether they are equal. The input voltage detection amplifier circuit 230 may reset the input adapting voltage upon detecting that the first initial measure charge current has reached the first low detect current, and may maintain the current input adapting voltage upon detecting that the first initial measure charge current has not reached the first low detect current.

At Time C, the input voltage detection amplifier circuit 230 may reset the input voltage of the fuel cell as a second input adapting voltage ($2^{nd}$ IAV). The second input adapting voltage may be slightly lower than the first input adapting voltage, and may be set to one of voltage values within an optimum output range for the fuel cell. For example, if the optimal voltage of the fuel cell ranges between 0.7 V and 1.0 V, the first input adapting voltage may be 0.74 V, and the second input adapting voltage may be 0.72 V. The output of the fuel cell may be adjusted upward or downward, or the input adapting voltage may be reset to a voltage that is lower or higher than the previous input adapting voltage (IAV) to adapt to a change in battery charging condition, in order to control the output. Afterwards, the input voltage detection amplifier circuit 230 may detect whether the decreasing current reaches a second low detect current ($2^{nd}$ LDC).

At Time D, the input voltage detection amplifier circuit 230 may repeat the operation it has performed at Time C. For example, an N-th input adapting voltage (N IAV) may be set, and the output current may be controlled to be set at an N-th initial measure charge current (N IMCC) based on the N-th input adapting voltage (N IAV). That is, the input voltage detection amplifier circuit 230 may repeat the operations it has performed at Time C and Time D during charging of the battery. Accordingly, the fuel cell may be run steadily at a fixed voltage, and since the voltage input to the charger is fixed, the output current from the charger may decrease continuously during charging of the battery. That is, tapered lines may appear, as shown in the charger output current graph (dash-dot-dot line) in the middle portion of FIG. 3. In this case, the slope from the first initial measure charge current to a second initial measure charge current may be different than the slope from the second initial measure charge current to a third initial measure charge current. As well as the difference in slope, there may be a difference in term or current value between the first initial measure charge current and the second initial measure charge current.

Meanwhile, once charging is done by repeatedly resetting the input adapting voltage by the input voltage detection amplifier circuit 230 as described above, the state of charge (SoC) of the battery (battery pack) increasingly approaches a fully charged state. That is, at Time E, the state of charge of the battery reaches a constant voltage (CV) level. The charging system 100 may detect a gradual increase in the voltage of the battery being charged.

At Time F and Time G, when the battery voltage has reached the constant voltage (CV) level, the input voltage detection amplifier circuit 230 may determine that the battery, with a full capacity condition setting (80%, for example), has become fully charged (that the battery has reached its full capacity of 80%, for example). For example, the input voltage detection amplifier circuit 230 may determine whether the battery is fully charged or not, by detecting whether the input voltage to the charger has reached a first increasing voltage detect point ($1^{st}$ IVDP). The input voltage detection amplifier circuit 230 may set in advance the number of times the increasing voltage detect point is reached, and may determine whether the battery is fully charged or not, by counting the number of times the input voltage reaches the increasing voltage detect point (for example, the number of times an N-th increasing voltage detect point (N IVDP) is reached). Here, the expression "the battery is in a fully charged state" means that the battery is charged up to 80 to 85%, in consideration for the battery's life. The constant voltage level for the battery's fully charged state may be determined depending on how the charging system 100 is configured.

At Time G, upon detecting the increasing voltage detect point (N IVDP) once more, the input voltage detection amplifier circuit 230 may terminate the charging process (terminate the operation of the fuel cell and terminate the charging). At Time G, the input adapting voltage is not reset, and therefore the charger output current drops to a termination current. Although the input voltage detection amplifier circuit 230 is described as having detected the increasing voltage detect point twice at Time F and Time G, respectively, the number of times the increasing voltage detect point is detected may be changed as much as needed.

Figure 4:
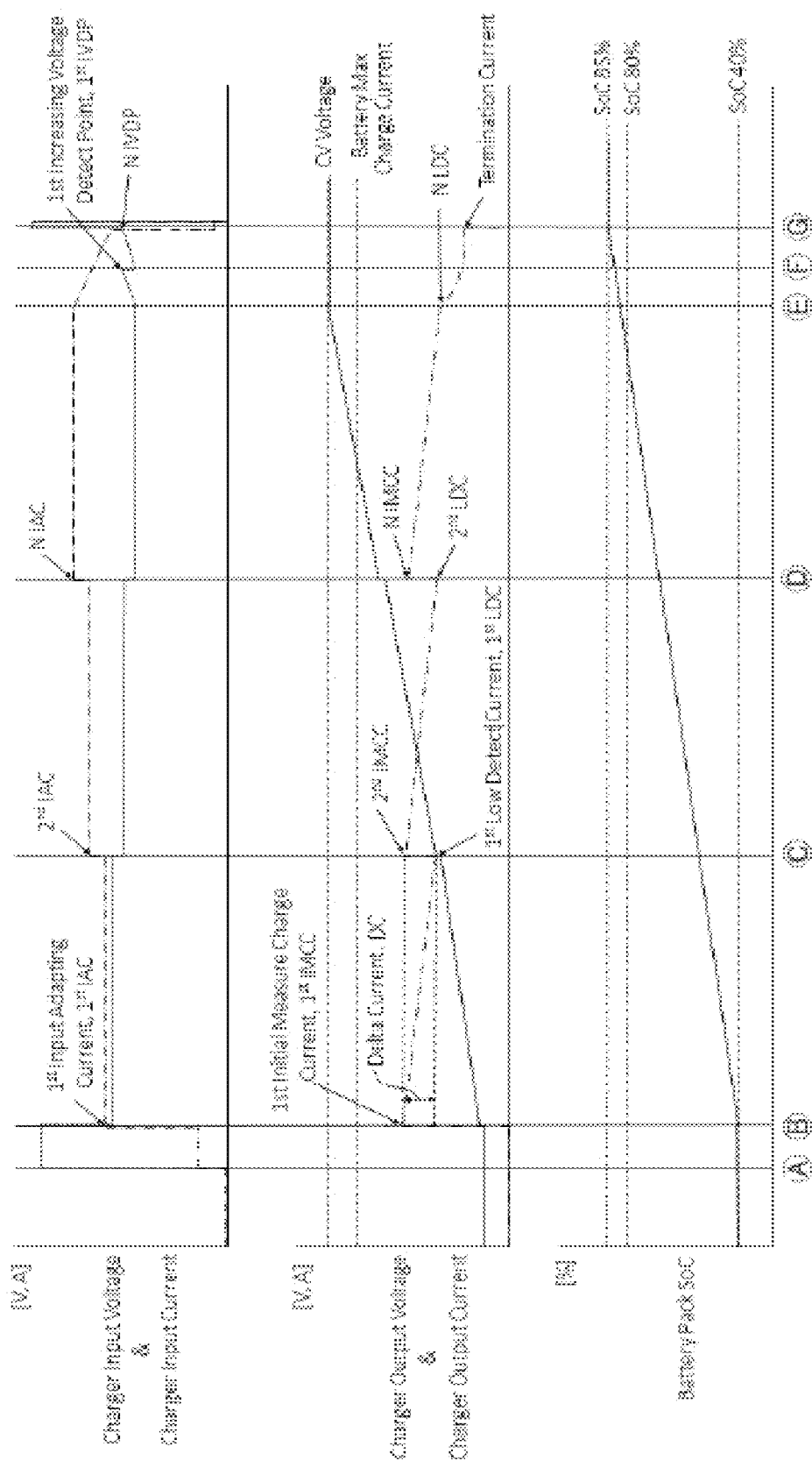
FIG. 4 is a view showing a process of performing charging by setting an input adapting current.

FIG. 4 is a view showing a process of performing charging by setting an input adapting current.

An upper portion of FIG. 4 shows a graph of charger input voltage and charger input current, a middle portion of FIG. 4 shows a graph of charger output voltage and charger output current, and a lower portion of FIG. 4 shows a graph of the state of charge (SoC) of a battery pack. The charger input voltage is indicated by a dotted line, the charger input current is indicated by a dash-dotted line, the charger output voltage is indicated by a solid line, and the charger output current is indicated by a dash-dot-dot line.

Referring to FIG. 4, the input adapting current may be set by the input current detection amplifier circuit 240 which has been described with reference to FIG. 2. The input current detection amplifier circuit 240 may perform battery charging by setting the current input from the fuel cell as the input adapting current.

The input adapting current is set largely in a similar manner to the input adapting voltage which has been described with reference to FIG. 3, except that current, instead of voltage, is controlled. That is, the operations at other points in time other than Times B, C, and D may be performed in the same manner as in FIG. 3. Only the operations at Times B, C, and D will be described below.

At Time B, the input current detection amplifier circuit 240 sets a first input adapting current (1st IAC). Like the input adapting voltage, the first input adapting current may be set before the battery is charged. Before performing charging, the charging system 100 may receive at least one of the charger's constant voltage (CV), constant current (CC), termination current (TC), delta current (DC), input adapting current, and increasing voltage detection point based on information on an optimal operation and optimal temperature for the fuel cell, to configure the circuit. Although what the input current detection amplifier circuit 240 sets is the current input to the charger, the voltage input to the charger also may be kept constant in reality. That is, the current output from the charger (charger output current) may decrease gradually, just as it does when the input adapting voltage is set as shown in FIG. 3.

At Time C, the input current detection amplifier circuit 240 may reset the input current of the fuel cell as a second input adapting current ($2^{nd}$ IAC). The second input adapting current may be slightly higher than the first input adapting current, and may be set to one of voltage values within an optimum output range of the fuel cell. For example, if the optimal current of the fuel cell ranges between 0.7 A and 1.0 A, the first input adapting current may be 0.85 A, and the second input adapting current may be 0.9 A. The output of the fuel cell may be adjusted upward or downward, or the input adapting current may be reset to a current that is higher or lower than the previous input adapting current (IAC) to adapt to an adjustment in battery full capacity (e.g., adjustment from 80% to 85%), in order to control the output.

At Time D, the input current detection amplifier circuit 240 may repeat the operation it has performed at Time C. That is, an N-th input adapting current (N IAC) may be set, and the output current may be controlled to be set at an N-th initial measure charge current (N IMCC) based on the N-th input adapting voltage (N IAC). The charging system 100 may repeat the operations it has performed at Time C and Time D during charging of the battery.

Figure 5:
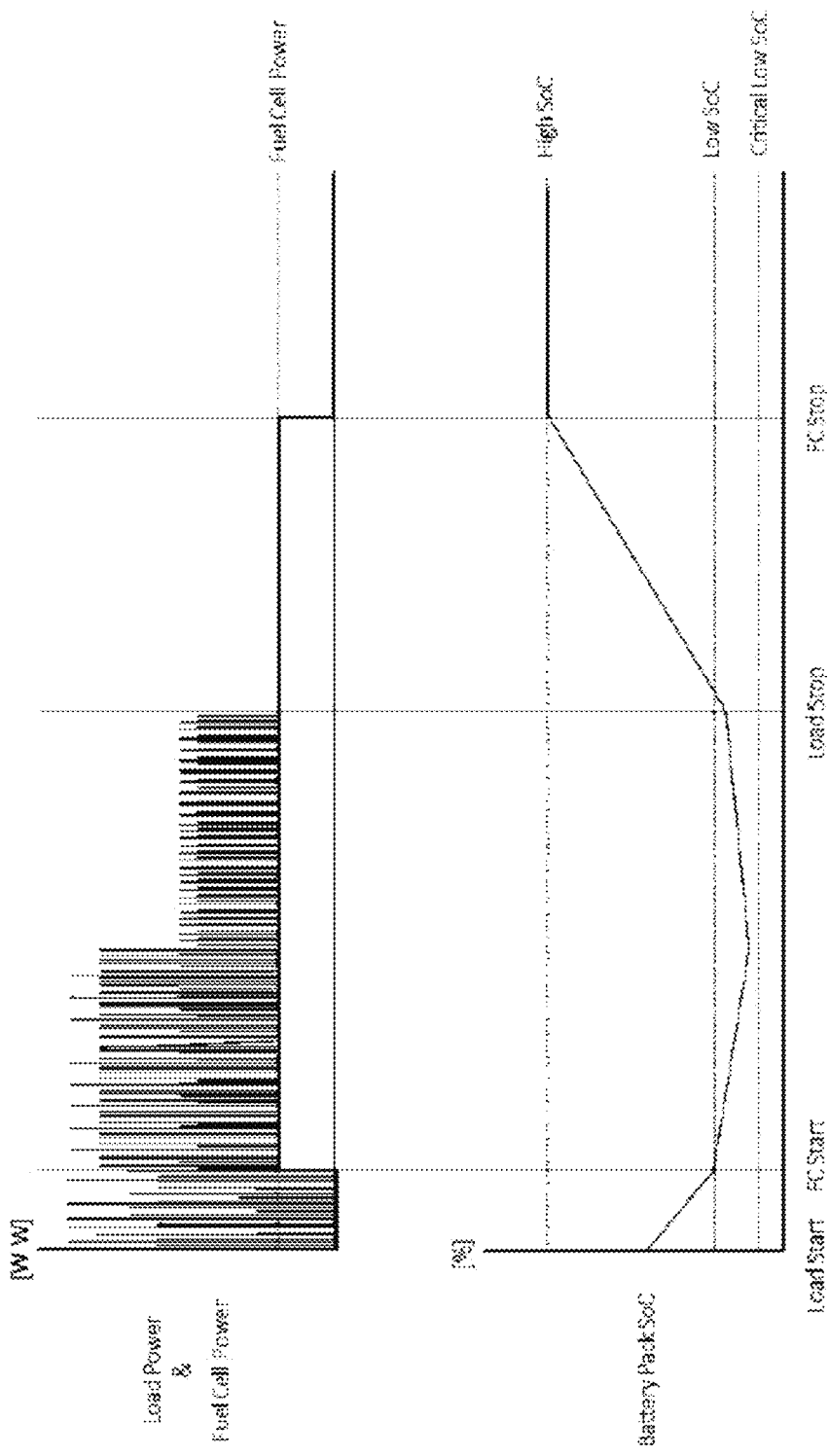
FIG. 5 is a view showing an operating cycle of a fuel cell when a load occurs.

FIG. 5 is a view showing an operating cycle of a fuel cell when a load occurs.

An upper portion of FIG. 5 shows a graph of load power and fuel cell power, and a lower portion of FIG. 5 shows a graph of the state of charge (SoC) of a battery pack. FIG. 5 illustrates by way of example how the fuel cell operates over time and how the battery is charged over time, when the power consumption of the load is high at an initial stage and then decreases gradually.

Referring to FIG. 5, the fuel cell may operate through a cycle of load start, fuel cell (FC) start, load stop, and fuel cell (FC) stop. The fuel cell may start running to produce electrical power sometime after the start of a load. The time when the fuel cell starts running may vary depending on the state of charge (SoC) of the battery pack. For example, the time when the fuel cell starts running may be delayed further as long as the remaining power of the battery is enough for load operation, and the time when the fuel cell starts running may be advanced if the remaining power of the battery is not enough.

Meanwhile, the electrical power produced from the fuel cell may be supplied steadily to the charger until the time when the fuel cell stops running. That is, the fuel cell may be run steadily only based on the state of charge of the battery, rather than performing charging depending on whether the power consumption of the load is high or low. As shown in FIG. 5, even though the actual amount of power consumption of the load changes (increases and then decreases) gradually from the time the fuel cell starts running until the time the fuel cell stops running, the fuel cell is being run steadily to produce electrical power regardless of the power consumption of the load. In other words, the charging system 100 may control the operation of the fuel cell by controlling (delaying or advancing) the time when electrical power production is terminated, rather than by increasing or decreasing electrical power production by the fuel cell in real time, taking into consideration the power consumption of the load. Accordingly, the charging system 100 is able to run the fuel cell stably in an optimal condition.

Figure 6:
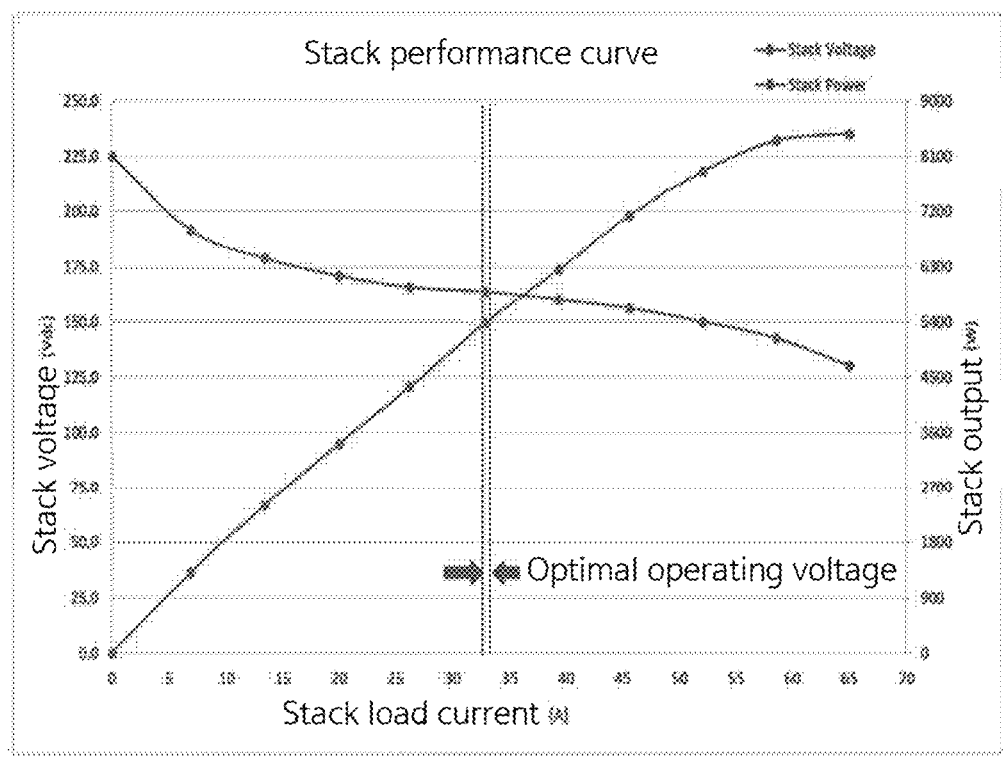
FIG. 6 is a view showing a stack performance curve of a fuel cell.

FIG. 6 is a view showing a stack performance curve of a fuel cell.

As shown in FIG. 6, the fuel cell needs to be run in an optimal output voltage interval to ensure high performance, and, if the fuel cell is run at a voltage that is lower or higher than that interval, its performance may be deteriorated or its life span may be shortened. For example, if run at a voltage lower than the optimal output voltage, the fuel cell may be overheated. As another example, if run at a voltage higher than the optimal output voltage, the fuel cell may not be able to serve its function due to oxidation of a catalyst (platinum catalyst) or due to combustion of carbon.

Meanwhile, the optimum output voltage interval may vary more or less with the manufacturer, model, etc. of the fuel cell. Thus, the optimal output voltage interval of the fuel cell provided in the charging system 100 may be identified based on information on an optimal operation and optimal temperature for the fuel cell, provided from the manufacturer of the fuel cell, and the input adapting voltage may be set based on the optimal output voltage interval, thereby preventing degradation and aging of the fuel cell.

Figure 7:
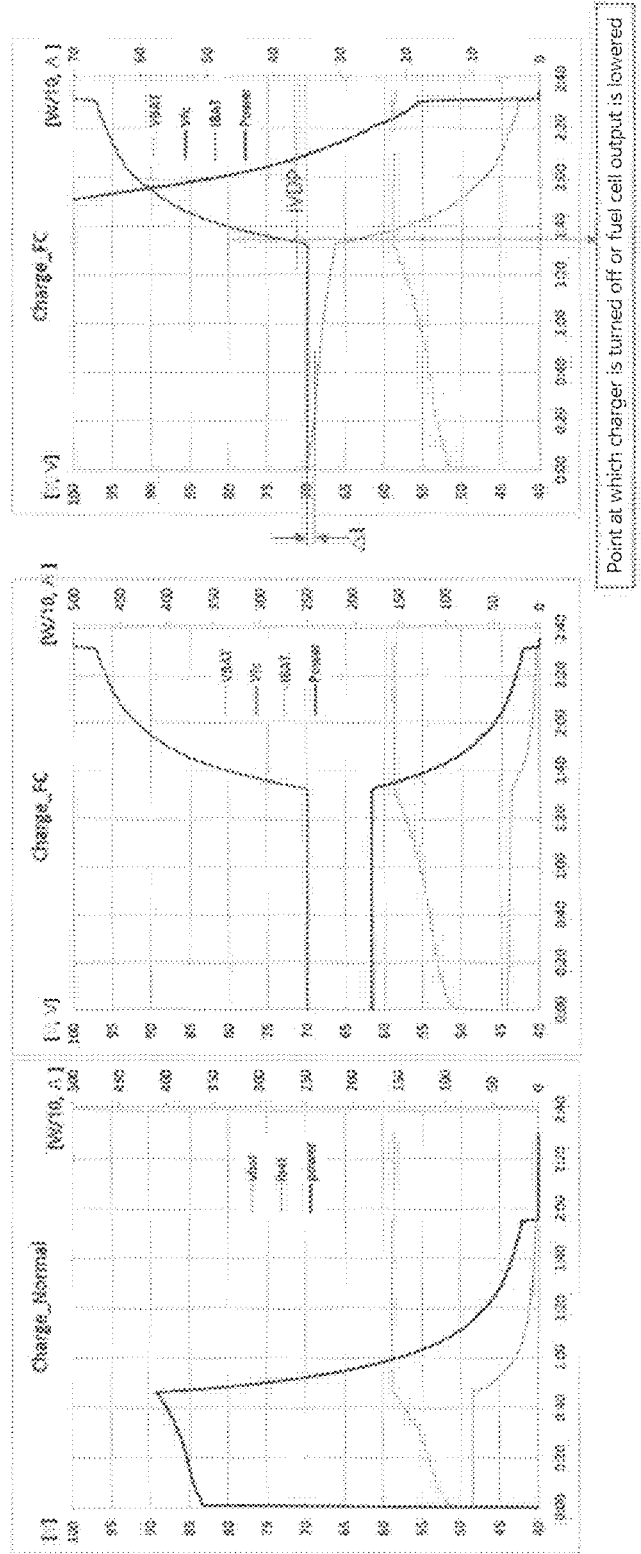
FIG. 7 is a view showing a comparison of a conventional charging method and a charging method according to an embodiment of the present disclosure.

FIG. 7 is a view showing a comparison of a conventional charging method and a charging method according to an embodiment of the present disclosure.

Referring to FIG. 7, the graph on the left shows a typical charging method, and the graphs in the middle and on the right show a charging method for the charging system 100 of the present disclosure. First, the typical charging method is a method in which charging is controlled by setting a maximum voltage limit on charging voltage or setting a maximum current limit on charging current. That is, charging may be controlled in such a manner that the voltage limit or the current limit is not exceeded.

On the other hand, the charging method for the charging system 100 of the present disclosure is a method in which charging is controlled by setting a voltage limit on minimum input voltage. That is, charging may be controlled in such a way that the minimum input voltage does not fall to or below the voltage limit (input adapting voltage). Based on a difference in output current which is decreasing compared to initial charging current, the charger may be turned on or off, or the output power of the fuel cell may be increased. In other words, when charging with constant power by controlling the input voltage, the battery's voltage rises over time as the battery is charged, compared to fixed input power, leading to a decrease in output current. In this case, the amount of decrease in current (delta value) may be preset. Thus, if the amount of decrease in current falls to or below a preset value, the output of the fuel cell may be raised, and, if the input voltage rises to or above a set voltage (increasing voltage detect point, IVDP) with decreasing output power as the battery is charged, the charger may be turned off or the output of the fuel cell may be lowered.

Figure 8:
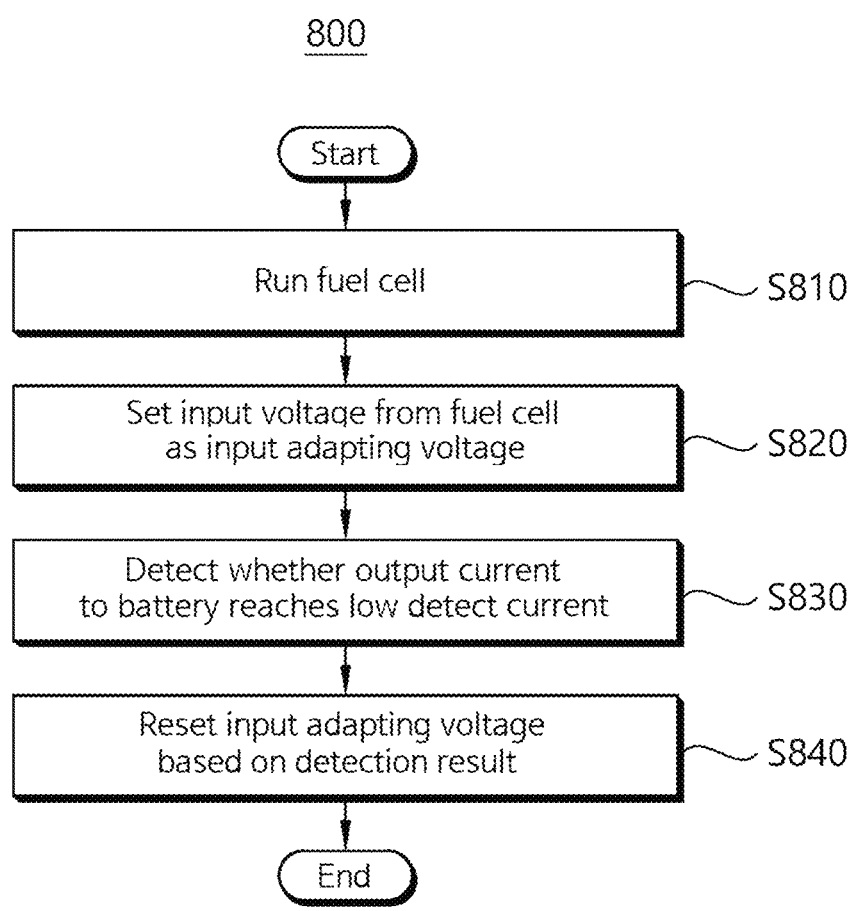
FIG. 8 is a flowchart of a method for charging a battery using a fuel cell according to an embodiment of the present disclosure.

FIG. 8 is a flowchart of a method for charging a battery using a fuel cell according to an embodiment of the present disclosure.

Referring to FIG. 8, a battery charging method 800 using a fuel cell includes the steps S810 to S840. The battery charging method 800 using a fuel cell according to this embodiment will be described with respect to an operation performed by the charging system 100 described with reference to FIGS. 1 to 7.

In the step S810, the charging system 100 runs the fuel cell. The charging system 100 may run the fuel cell to produce electrical power for charging the battery. Before performing the step S810, the charging system 100 may perform the step of setting at least one of the charger's constant voltage (CV), constant current (CC), termination current (TC), delta current (DC), input adapting voltage, and increasing voltage detection point based on information on an optimal operation and optimal temperature for the fuel cell.

In the step S820, the charging system 100 sets a voltage input from the fuel cell as a first input adapting voltage ($1^{st}$ IAV), when the input power from the fuel cell is lower than the output power to the battery. The charging system 100 may limit the voltage input to the charger from the fuel cell to an input adapting voltage and then keep the input adapting voltage constant.

Additionally, the charging system 100 may perform the step of setting an increasing voltage detect point (IVDP) for the voltage input from the fuel cell. Upon detecting a certain number of times or more that the voltage input from the fuel cell exceeds the increasing voltage detect point, the charging system 100 may stop charging the battery. The step of setting an increasing voltage detect point may be performed simultaneously or sequentially with the step S820.

In the step S830, the charging system 100 detects whether an output current to the battery reaches a first low detect current ($1^{st}$ LDC) while the battery is being charged based on the first input adapting voltage. The charging system 100 may set a delta current for the output current before performing the step S830, and may detect whether the value of current decreasing gradually from an initial output current reaches the low detect current (initial output current minus delta current).

In the step S840, the charging system 100 resets the first input adapting voltage based on a detection result. The charging system 100 may reset the first input adapting voltage as a second input adapting voltage ($2^{nd}$ IAV) if the output current reaches the first low detect current. The charging system 100 may maintain the first input adapting voltage unless the output current reaches the first low detect current. When resetting the first input adapting voltage as the second input adapting voltage, the charging system 100 may charge the battery based on the second input adapting voltage. The charging system 100 may then detect whether the output current to the battery reaches a second low detect current (2nd LDC) during charging. The charging system 100 may perform the step of repeatedly resetting the input adapting voltage before the battery reaches a fully charged state.

Figure 9:
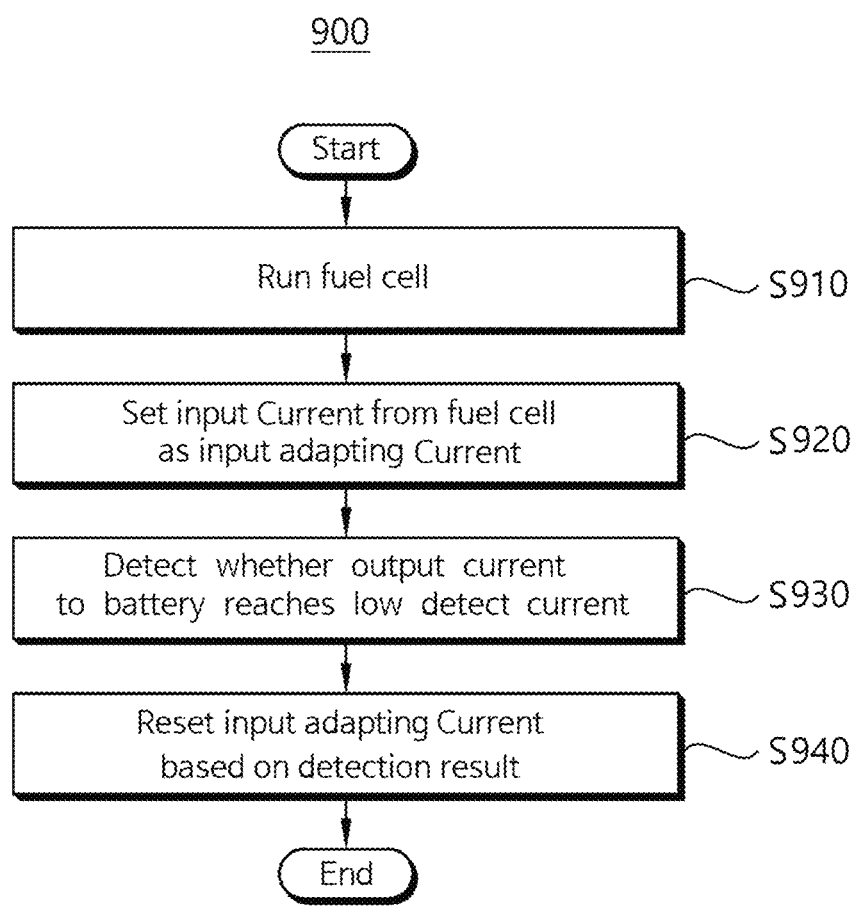
FIG. 9 is a flowchart of a method for charging a battery using a fuel cell according to another embodiment of the present disclosure.

FIG. 9 is a flowchart of a method for charging a battery using a fuel cell according to another embodiment of the present disclosure.

Referring to FIG. 9, a battery charging method 900 using a fuel cell includes the steps S910 to S940. The battery charging method 900 using a fuel cell according to this embodiment will be described with respect to an operation performed by the charging system 100 described with reference to FIGS. 1 to 7. The charging method 900 of FIG. 9 may be performed in the same manner as the charging method 800 of FIG. 8, except for the steps S920 and S940.

In the step S910, the charging system 100 runs the fuel cell. The step S910 may be performed in the same manner as the step S810 of FIG. 8. Before performing the step S910, the charging system 100 may perform the step of setting at least one of the charger's constant voltage (CV), constant current (CC), termination current (TC), delta current (DC), input adapting current, and increasing voltage detection point based on information on an optimal operation and optimal temperature for the fuel cell.

In the step S920, the charging system 100 sets a current input from the fuel cell as a first input adapting current (1st IAC), when the input power from the fuel cell is lower than the output power to the battery. The charging system 100 may limit the current input to the charger from the fuel cell to an input adapting current. By limiting the current input to the charger to an input adapting current, the charging system 100 has the effect of limiting the voltage input to the charger to an input adapting voltage.

In the step S930, the charging system 100 detects whether an output current to the battery reaches a first low detect current ($1^{st}$ LDC) while the battery is being charged based on the first input adapting current. The step S930 may be performed in the same manner as the step S830 of FIG. 8.

In the step S940, the charging system 100 resets the first input adapting current based on a detection result. The charging system 100 may reset the first input adapting current as a second input adapting current ($2^{nd}$ IAC) if the output current reaches the first low detect current. The charging system 100 may maintain the first input adapting current unless the output current reaches the first low detect current. When resetting the first input adapting current as the second input adapting current, the charging system 100 may charge the battery based on the second input adapting current. The charging system 100 may then detect whether the output current to the battery reaches a second low detect current (2nd LDC) during charging. The charging system 100 may perform the step of repeatedly resetting the input adapting current before the battery reaches a fully charged state.

While a method and system for charging a battery using a fuel cell according to an embodiment of the present disclosure have been described with reference to the embodiments illustrated in the drawings, the embodiments are for illustrative purposes only, and those skilled in the art to which the present disclosure pertains will understand that various modifications of the embodiment and any other embodiment equivalent thereto are available. Accordingly, the true technical protection scope of the present disclosure should be determined by the technical spirit of the appended claims.

What is claimed is:
1. A method for charging a battery using a fuel cell, the method comprising:
running the fuel cell;
setting a voltage input from the fuel cell as a preset first input adapting voltage ($1^{st}$ IAV), when the input power from the fuel cell is lower than the output power to the battery;
detecting whether an output current to the battery reaches a first low detect current ($1^{st}$ LDC) while the battery is being charged based on the first input adapting voltage; and
controlling the voltage input from the fuel cell to remain constant by resetting the first input adapting voltage based on a detection result,
wherein the controlling step comprises:
resetting the first input adapting voltage to a second input adapting voltage ($2^{nd}$ IAV) if the output current reaches the first low detect current; and
maintaining the first input adapting voltage if the output current does not reach the first low detect current.

2. The method of claim 1, further comprising setting an increasing voltage detect point (IVDP) for the voltage input from the fuel cell.

3. The method of claim 1, wherein the setting of an increasing voltage detect point further comprises stopping charging the battery upon detecting a certain number of times or more that the voltage input from the fuel cell exceeds the increasing voltage detect point.

4. The method of claim 1, further comprising, before running the fuel cell, setting at least one of the charger's constant voltage (CV), constant current (CC), termination current (TC), delta current (DC), input adapting voltage, and increasing voltage detection point based on information on an optimal operation and optimal temperature for the fuel cell.

5. The method of claim 1, further comprising detecting whether the output current to the battery reaches a second low detect current (2nd LDC) while the battery is being charged based on the second input adapting voltage.

6. The method of claim 1, wherein the second input adapting voltage is set to a voltage that is lower or higher than the first input adapting voltage.

7. The method of claim 1, wherein the controlling comprises repeatedly resetting the first input adapting voltage before the battery reaches a constant voltage or the state of charge of the battery reaches a preset fully capacity.

8. A method for charging a battery using a fuel cell, the method comprising:
running the fuel cell;
setting a current input from the fuel cell as a preset first input adapting current ($1^{st}$ IAC), when the input power from the fuel cell is lower than the output power to the battery;
detecting whether an output current to the battery reaches a first low detect current ($1^{st}$ LDC) while the battery is being charged based on the first input adapting current; and
controlling the current input from the fuel cell to remain constant by resetting the first input adapting current based on a detection result,
wherein the controlling step comprises:
resetting the first input adapting current to a second input adapting current ($2^{nd}$ IAC) if the output current reaches the first low detect current; and
maintaining the first input adapting current if the output current does not reach the first low detect current.

9. The method of claim 8, further comprising setting an increasing voltage detect point (IVDP) for the voltage input from the fuel cell.

10. The method of claim 9, wherein the setting of an increasing voltage detect point further comprises stopping charging the battery upon detecting a certain number of times or more that the voltage input from the fuel cell exceeds the increasing voltage detect point.

11. The method of claim 8, further comprising, before running the fuel cell, setting at least one of the charger's constant voltage (CV), constant current (CC), termination current (TC), delta current (DC), input adapting current, and increasing voltage detection point based on information on an optimal operation and optimal temperature for the fuel cell.

12. The method of claim 8, further comprising detecting whether the output current to the battery reaches a second low detect current (2nd LDC) while the battery is being charged based on the second input adapting current.

13. The method of claim 8, wherein the second input adapting current is set to a current that is higher or lower than the first input adapting current.

14. The method of claim 8, wherein the controlling comprises repeatedly resetting the first input adapting current before the battery reaches a constant voltage or the state of charge of the battery reaches a preset fully capacity.

15. A system for charging a battery using a fuel cell, the system comprising:
a fuel cell;
a battery;
a fuel cell part for running the fuel cell;
a constant voltage mode circuit which sets a limit when an output voltage of a charger is higher than a reference voltage;
a constant current mode circuit which sets a limit when an output current of the charger is higher than a reference current;
a charging circuit that sets a voltage input from the fuel cell as a preset first input adapting voltage ($1^{st}$ IAV), when the input power from the fuel cell is lower than the output power to the battery based on operations of the constant voltage mode circuit and the constant current mode circuit, detects whether an output current to the battery reaches a first low detect current ($1^{st}$ LDC), and controls the voltage input from the fuel cell to remain constant by resetting the first input adapting voltage based on a detection result; and
a battery part for charging the battery based on the first input adapting voltage,
wherein the charging circuit resetting the first input adapting voltage to a second input adapting voltage ($2^{nd}$ IAV) if the output current reaches the first low detect current; and
maintaining the first input adapting voltage if the output current does not reach the first low detect current.

16. A system for charging a battery using a fuel cell, the system comprising:
a fuel cell;
a battery;
a fuel cell part for running the fuel cell;
a constant voltage mode circuit which sets a limit when an output voltage of a charger is higher than a reference voltage;
a constant current mode circuit which sets a limit when an output current of the charger is higher than a reference current;
a charging circuit that sets a current input from the fuel cell as a preset first input adapting current ($1^{st}$ IAC), when the input power from the fuel cell is lower than the output power to the battery based on operations of the constant voltage mode circuit and the constant current mode circuit, detects whether an output current to the battery reaches a first low detect current ($1^{st}$ LDC), and controls the voltage input from the fuel cell to remain constant by resetting the first input adapting current based on a detection result; and
a battery part for charging the battery based on the first input adapting current,
wherein the charging circuit resetting the first input adapting current to a second input adapting current ($2^{nd}$ IAC) if the output current reaches the first low detect current; and
maintaining the first input adapting current if the output current does not reach the first low detect current.

* * * * *